US006707490B1

(12) United States Patent
Kido et al.

(10) Patent No.: US 6,707,490 B1
(45) Date of Patent: Mar. 16, 2004

(54) DIGITAL CAMERA, CAMERA MAIN BODY AND METHOD FOR PROCESSING SIGNAL

(75) Inventors: Toshihito Kido, Matsubara (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/361,981

(22) Filed: Jul. 28, 1999

(30) Foreign Application Priority Data

Jul. 29, 1998 (JP) .......................... 10-214486

(51) Int. Cl.[7] .................... H04N 5/232; H04N 5/225; A61B 1/04
(52) U.S. Cl. ................. 348/211.14; 348/72; 348/373; 358/906
(58) Field of Search ....................... 348/518, 72, 73, 348/75, 76, 211.14, 552, 373, 375, 376; 358/906, 909.1

(56) References Cited

U.S. PATENT DOCUMENTS

| | | | | |
|---|---|---|---|---|
| 4,518,927 A | * | 5/1985 | Koppe et al. | 330/284 |
| 4,831,444 A | * | 5/1989 | Kato | 348/518 |
| 4,845,555 A | * | 7/1989 | Yabe et al. | 348/72 |
| 5,245,291 A | * | 9/1993 | Fujimura | 324/617 |
| 5,389,968 A | * | 2/1995 | Koyanagi et al. | 348/222.1 |
| 5,434,615 A | * | 7/1995 | Matumoto | 348/72 |
| 5,486,853 A | * | 1/1996 | Baxter et al. | 348/222.1 |
| 5,585,840 A | * | 12/1996 | Watanabe et al. | 348/65 |
| 5,867,218 A | * | 2/1999 | Matsuzaki et al. | 348/373 |
| 6,141,505 A | * | 10/2000 | Miyata et al. | 396/535 |
| 6,201,570 B1 | * | 3/2001 | Murata et al. | 348/211.5 |
| 6,392,698 B1 | * | 5/2002 | Yokoyama | 348/222.1 |
| 6,449,007 B1 | * | 9/2002 | Yokoyama | 348/73 |
| 2002/0191096 A1 | * | 12/2002 | Tanaka et al. | 348/333.06 |
| 2003/0123859 A1 | * | 7/2003 | Ikeda | 386/120 |
| 2003/0142219 A1 | * | 7/2003 | McGarvey et al. | 348/222.1 |

FOREIGN PATENT DOCUMENTS

| | | | | |
|---|---|---|---|---|
| JP | 07095458 | | 4/1995 | |
| JP | 07095458 A | * | 4/1995 | H04N/5/225 |
| JP | 10079858 A | * | 3/1998 | H04N/1/409 |
| JP | 10079874 | | 3/1998 | |
| JP | 10079874 A | * | 3/1998 | H04N/5/222 |
| JP | 11341083 A | * | 12/1999 | H04L/25/03 |
| JP | 20011145099 A | * | 5/2001 | H04N/7/18 |

OTHER PUBLICATIONS

Machine Translation of Japanese Publication No. 10–079874 A, pp. 1–117, Thomson—Derwent.*

* cited by examiner

Primary Examiner—Vu Le
Assistant Examiner—John M. Villecco
(74) Attorney, Agent, or Firm—Burns, Doane, Swecker & Mathis, LLP

(57) ABSTRACT

A digital camera includes a camera main body, an image sensing unit which is detachably connected to the camera main body and electrically connectable to the camera main body via a cable in a state that the image sensing unit is detached from the camera main body. The image sensing unit includes a taking lens, an image pick-up element for picking up an object image focused by the taking lens, and an A/D converter which converts an analog image signal outputted from the image pick-up element into a digital image signal. The camera main body includes an image processor for subjecting a prescribed image processing to the digital image signal outputted from the A/D converter.

15 Claims, 14 Drawing Sheets

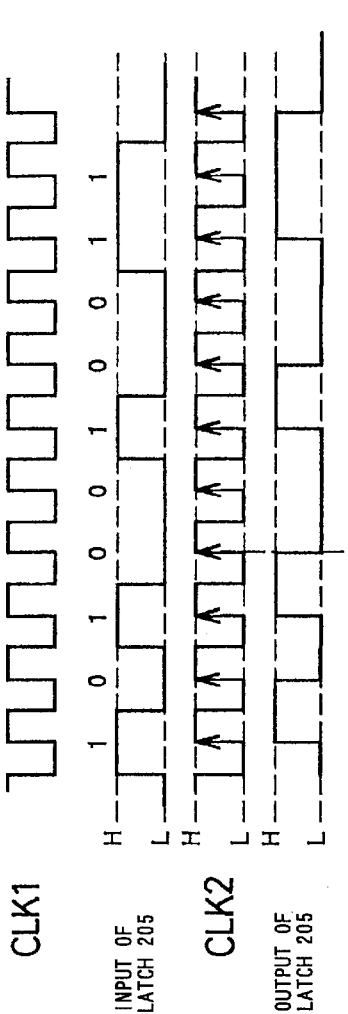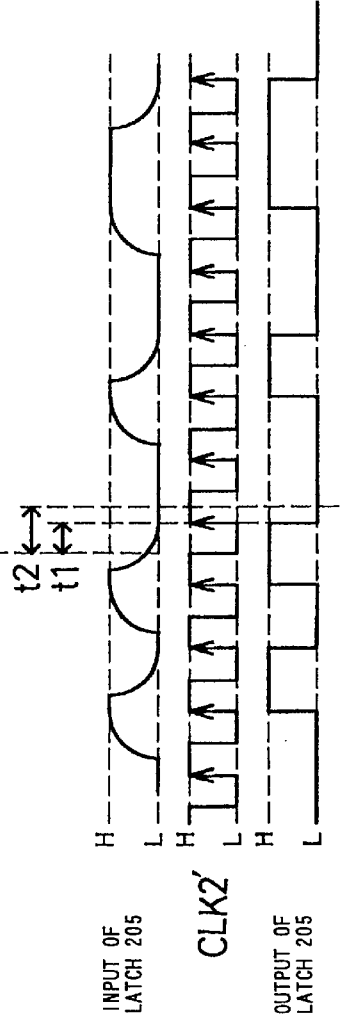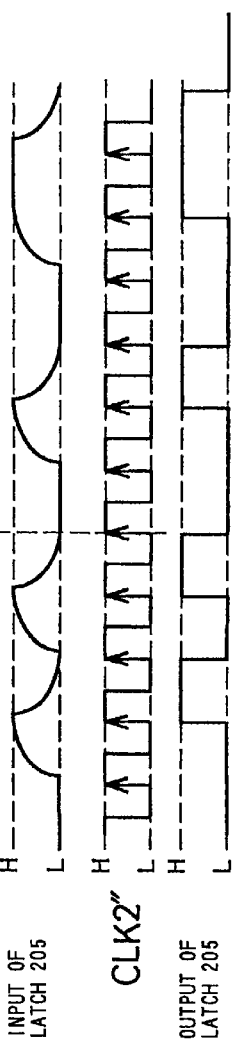
FIG.14A IN A CASE WHERE THE IMAGE SENSING UNIT 3 IS DIRECTLY CONNECTED TO THE CAMERA MAIN BODY 2
FIG.14B IN A CASE WHERE THE IMAGE SENSING UNIT 3 IS CONNECTED TO THE CAMERA MAIN BODY 2 VIA THE CABLE HAVING A LENGTH OF 1 METER
FIG.14C IN A CASE WHERE THE IMAGE SENSING UNIT 3 IS CONNECTED TO THE CAMERA MAIN BODY 2 VIA THE CABLE HAVING A LENGTH OF 5 METERS

DIGITAL CAMERA, CAMERA MAIN BODY AND METHOD FOR PROCESSING SIGNAL

The present invention claims a priority based on Japanese Patent Application No. H10-214486, the content of which is incorporated hereinto by reference in its entirety.

BACKGROUND OF THE INVENTION

1. Field of the Invention

This invention relates to a digital camera, a camera main body in a digital camera system and a method for processing a signal.

2. Description of the Related Art

There is a conventional digital camera which comprises an image sensing unit including a taking lens and an image pick-up element which converts an object image focused by the taking lens into an image signal and a camera main body including an image processing portion by which the image signal is subjected to a prescribed image processing.

As the aforementioned image pick-up element, a CCD (charged coupled device) as a photoelectric conversion element is generally used. When the optical image of the object is focused onto the surface of the CCD by the taking lens, the object image is photoelectrically converted into an analog image signal by the CCD. The generated analog image signal is converted into a digital image signal, and then the digital image signal is subjected to a predetermined image processing. Thus, image data can be obtained.

In a conventional digital camera of this kind, it is known that the image sensing unit including the taking lens, the image pick-up element and an analog circuit for the image pick-up element, is detachably connected to the camera main body and that the image sensing unit can be electrically connected to the camera main body by way of a cable in a case that the image sensing unit is detached from the camera main body. For example, the Japanese Patent Laid-open Publication No. H10-79874 discloses that the image sensing unit is detachably connected to the camera main body and that the phase delay of the image signal occurred in a case where the image sensing unit is connected to the camera main body via the cable is corrected.

In the aforementioned conventional digital camera, the A/D converter which converts the analog image signal generated by the CCD into the digital image signal is provided in the camera main body and the analog image signal outputted from the image sensing unit is transmitted to the camera main body as it is via the cable so as to be subjected to the A/D conversion at the camera main body. As a result, the image signal may be influenced by noise when the image signal is transmitted to the camera main body. Thus, the practical length of the cable will be limited to about 1 meter.

In the meantime, in order to transmit the analog signal through a cable of long length, it may be considered to raise the gain when amplifying the analog image signal in the image sensing unit. However, in this case, there will be the drawback that noise will be increased at the image sensing unit side and the power consumption rate of the batteries as a power source will be increased.

SUMMARY OF THE INVENTION

Therefore, it is an object of the present invention to provide a digital camera for practical use which can obtain an appropriate image signal without being influenced by noise even in a case where an image sensing unit is connected to a camera main body via a cable and is low in energy consumption rate.

Another object of the present invention is to provide a camera main body suitable for use in a digital camera system in which an image sensing unit and the camera main body are connected via a cable.

Still another object of the present invention is to provide a method for processing a signal which is applicable to the aforementioned digital camera system.

According to one aspect of the present invention, a digital camera includes a camera main body, an image sensing unit which is detachably connected to the camera main body and electrically connectable to the camera main body via a cable in a state that the image sensing unit is detached from the camera main body. The image sensing unit includes a taking lens, an image pick-up element for picking up an object image focused by the taking lens, and an A/D converter which converts an analog image signal outputted from the image pick-up element into a digital image signal. The camera main body includes an image processing apparatus for subjecting the digital image signal outputted from the A/D converter to a prescribed image processing.

With this digital camera, since the image sensing unit including the taking lens and the image pick-up element is detachably connected to the camera main body and they are connectable with each other via the cable in a detached state, a photographing can be performed at any desired angles. In addition, since the A/D converter is provided in the image sensing unit, the converted digital image signal is transmitted to the camera main body. However, since the digital signal is not easily affected by noise, an appropriate image signal can be obtained at the camera main body side even if the image sensing unit is connected to the camera main body via the cable.

BRIEF DESCRIPTION OF THE DRAWINGS

The above and other objects, features, and advantages of the present invention will be apparent from the following detailed description of the preferred embodiments with reference to the attached drawings, wherein:

FIG. 14 is a timing chart of the timing control when the image sensing unit is connected to the camera main body via the cable.

DETAILED DESCRIPTION OF THE PREFERRED EMBODIMENTS

The digital camera according to this embodiment will be explained with reference to FIGS. 1 to 3.

Figure 1:
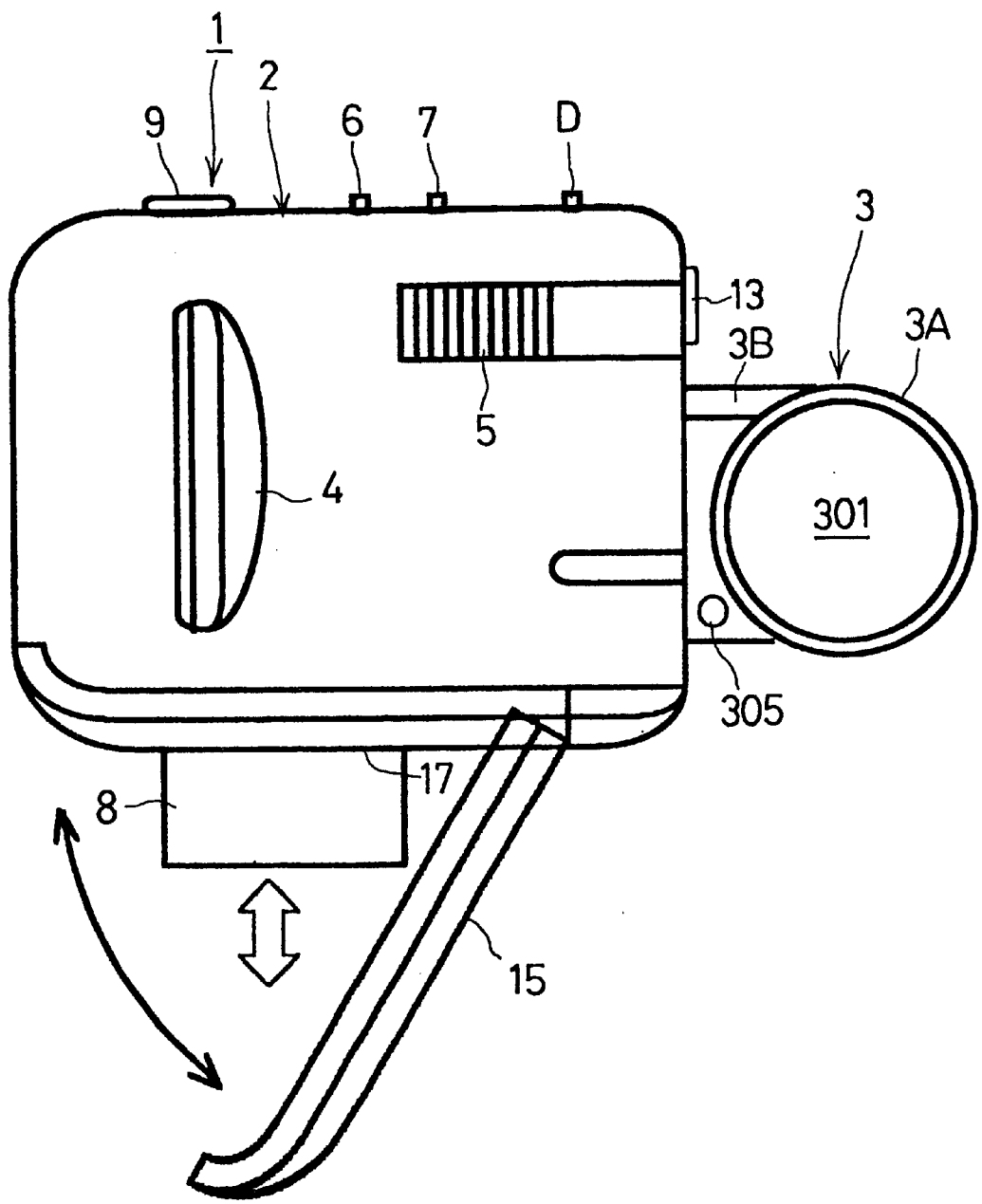
FIG. 1 is a front view of the digital camera according to an embodiment of the present invention.

As shown in FIG. 1, the digital camera 1 comprises a box-shaped camera main body 2 and a rectangular image sensing unit 3. The image sensing unit 3 is detachably connected to the right side of the camera main body 2 in the front view shown in FIG. 1 such that the image sensing unit 3 is rotatable within a plane parallel to the right side of the camera main body 2.

Figure 2:
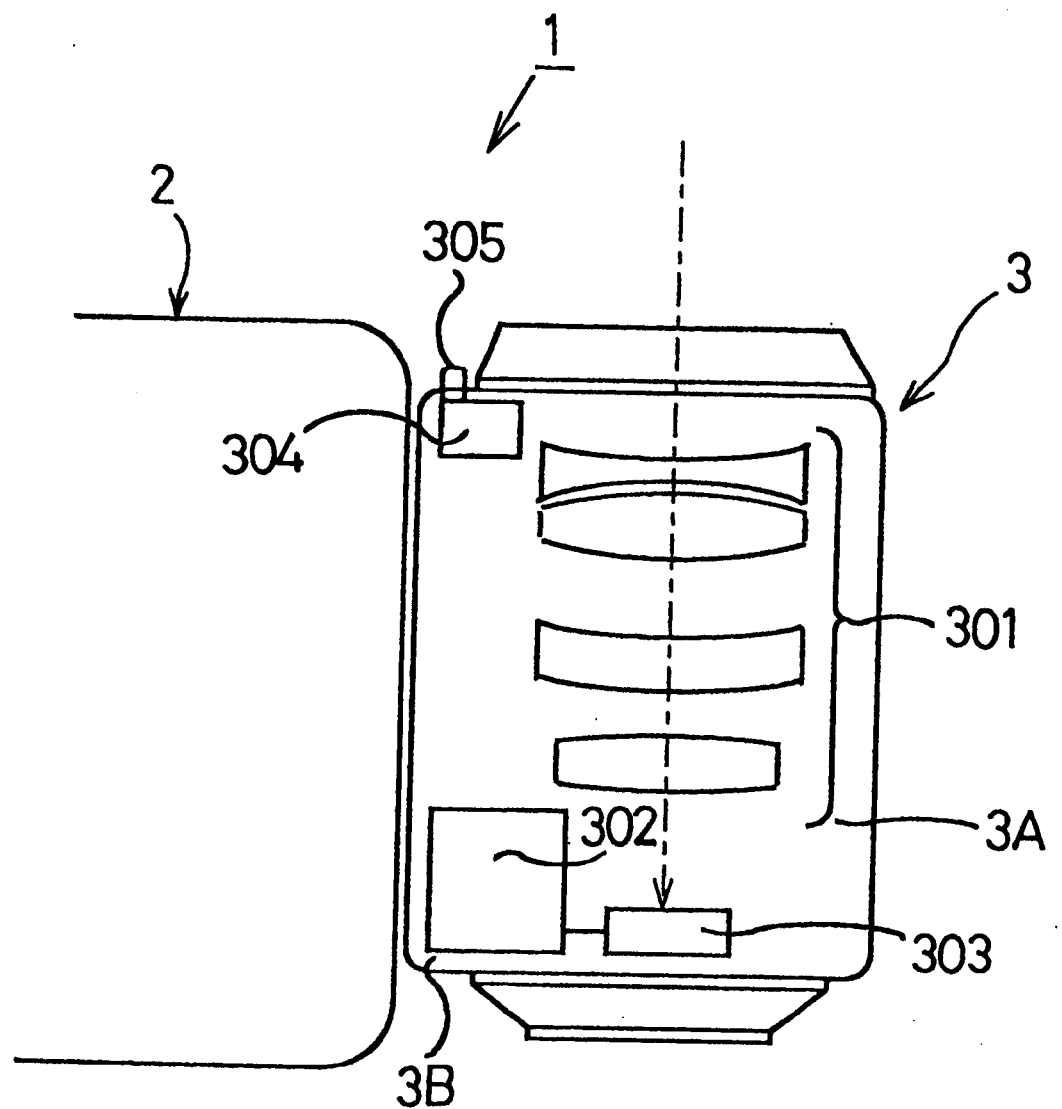
FIG. 2 is a top view of the image sensing unit of the digital camera shown in FIG. 1.

As shown in FIG. 2, the image sensing unit 3 has an elongated image sensing unit main body 3A having approximately the same length as the height of the camera main body 2 and approximately the same depth as the depth of the camera main body 2. A connecting portion 3B for connecting the image sensing unit main body 3A to the camera main body 2 is protruded outwardly from one side of the image sensing unit main body 3A. Since the image sen sing unit main body 3A has an elongated rectangular parallelepiped shape and is able to be positioned along the side of the camera main body 2 when not in use, it is possible to employ a zoom lense 301 having a long length along the optical-axis direction without increasing the depth of the digital camera 1.

A connecting mechanism of the connecting portion 3B for connecting the image sensing unit 3 to the camera main body 2 will be explained later.

As shown in FIG. 2, a macrozoom lens 301 is provided in the image sensing unit main body 3A. An image pick-up circuit 302 including a CCD colour area sensor 303 is located at an appropriate position behind the macrozoom lens 301. A light adjusting circuit 304 having a light adjusting sensor 305 for receiving flash light reflected from the object is provided at an appropriate position in the image sensing unit 3. As shown in FIG. 3, the image sensing unit 3 is provided with a lock-releasing lever 307 for detaching the image sensing unit 3 from the camera main body 2.

Figure 3:
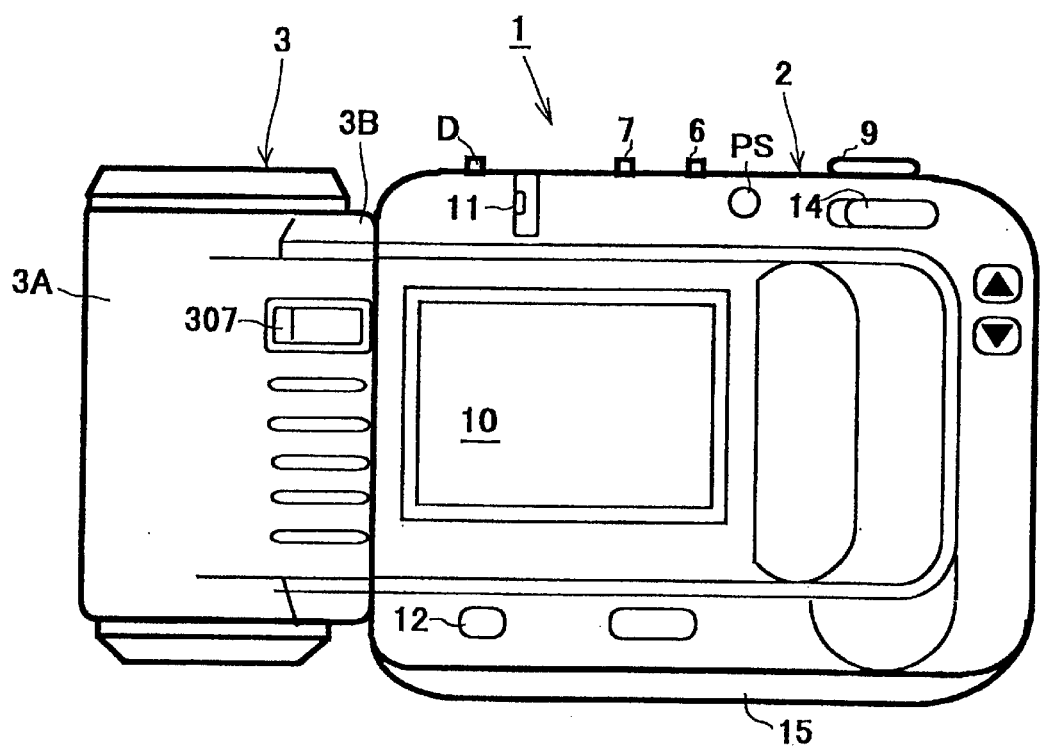
FIG. 3 is a rear view of the digital camera shown in FIG. 1.

As shown in FIGS. 1 to 3, the camera main body 2 has a display 10 or an LCD (Liquid Crystal Display), a slot 17 for receiving a memory card 8, and a connection terminal 13 for connecting the digital camera 1 to a personal computer. The image signal taken by the image sensing unit 3 is subjected to a prescribed image processing in the camera main body 2. The processed image is displayed on the LCD display 10, recorded in the memory card 8 and/or transferred to the personal computer.

Next, a connecting mechanism of a connecting portion 3B for connecting the image sensing unit 3 to the camera main body 2 will be explained.

Figure 4:
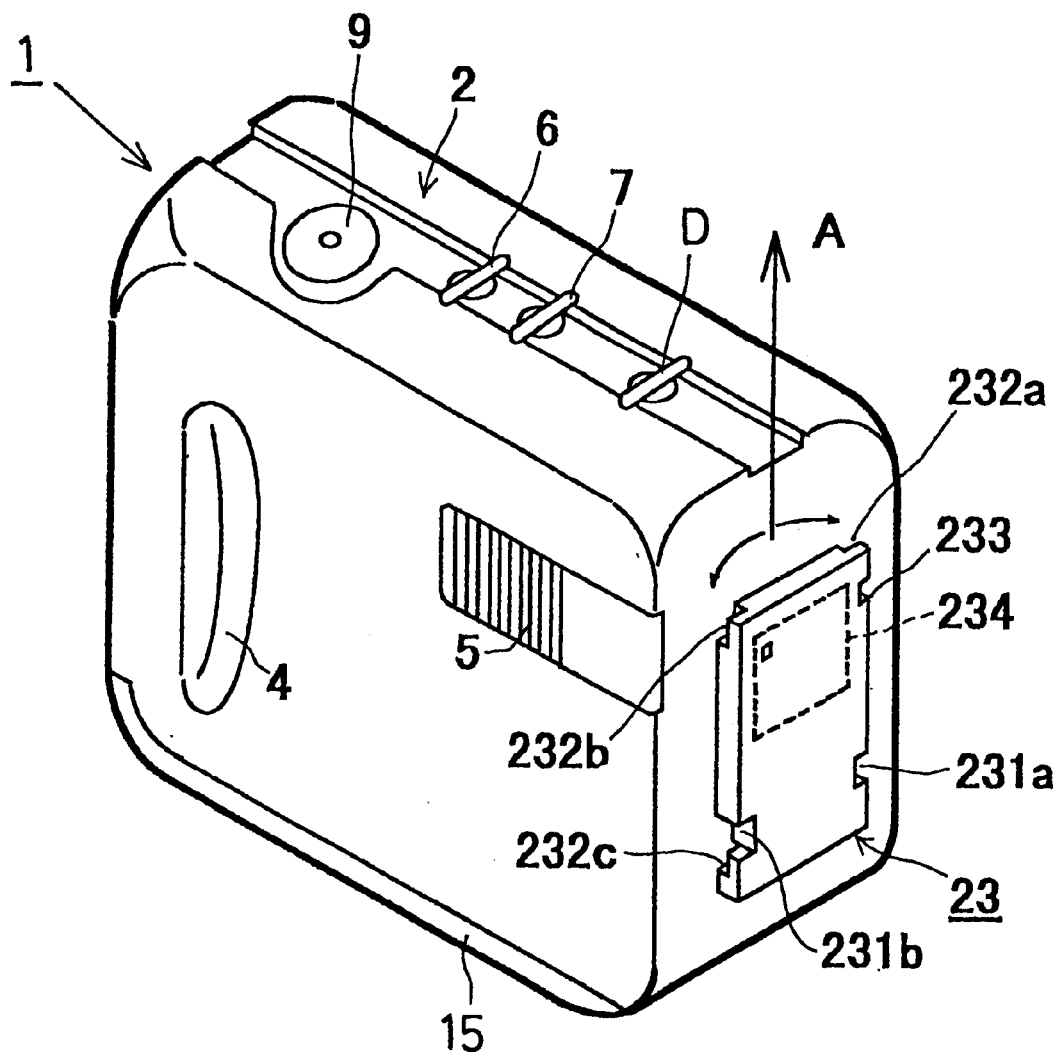
FIG. 4 is a perspective view of the camera main body with the connecting plate shown in FIG. 1.

As shown in FIG. 4, a connection plate 23 for detachably connecting the image sensing unit 3 is provided at the right side of the camera main body 2 when seen from the front such that the connection plate 23 is rotatable within a plane parallel to the right side of the camera main body 2. In accordance with the rotation of the connection plate 23, the image sensing unit 3 connected to the connecting plate 23 can be rotated by ±90 degrees from the rotation standard position A. The reference numeral 500 shown in FIG. 5 denotes a rotation support portion.

Figure 5:
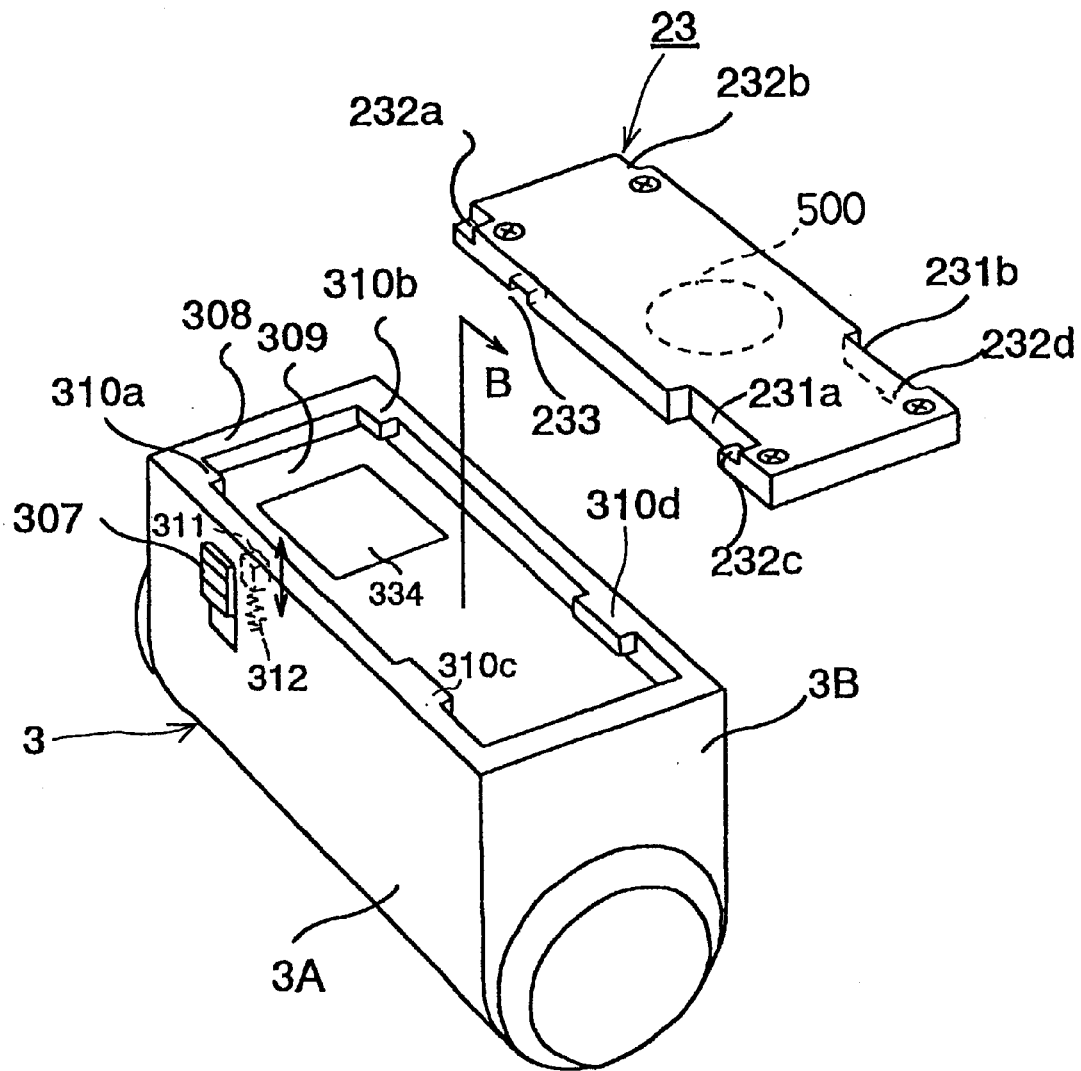
FIG. 5 is a perspective view of the connecting structure of the image sensing unit to which the connecting plate is connected.

As shown in FIG. 5, a rectangular dented portion 309 is formed on the connecting surface 308 of the connecting portion 3B. A total of four engaging ledges 310a, 310b, 310c, 310d are formed at appropriate portions of the inner periphery of the dented portion 309. Thus, the image sensing unit 3 can be connected to the camera main body 2 by fitting the connecting plate 23 into the dented portion 309 so as to be engaged therewith.

The connection plate 23 is provided with a connecting terminal portion 234 at its connecting surface as shown in FIG. 4. Within the dented portion 309, as shown in FIG. 5, a connecting terminal portion 334 with a plurality of connecting terminals is provided so as to face the connecting terminal portion 234 of the connecting plate 23. Thus, when the image sensing unit 3 is connected to the camera main body 2 by way of the connecting plate 23, the image sensing unit 3 and the camera main body 2 are electrically connected via the aforementioned connecting terminal portions 234, 334.

The connecting plate 23 has rectangular cut-out portions 231a, 231b at appropriate portions of the long sides of the connecting plate 23. On one surface having no connecting terminal portion 234 (hereinafter referred to as 'rear surface'), cut-out portions are formed at the longitudinal edge portions and the portions adjacent to the cut-out portions 231a, 231b to form engaging portions 232a, 232b, 232c, 232d for engaging the corresponding engaging ledges 310a, 310b, 310c 310d. On the other surface having the connecting terminal portion 234 (hereinafter referred to as 'front surface'), a groove is formed at an appropriate portion of the long side of the connecting plate 23 having the cut-out portion 231a to form an engaging portion 233 with which a key member 311 is engaged.

The connecting portion 3B of the image sensing unit 3 can be connected to the connecting plate 23 of the camera main body 2 by the following steps. First, the connecting surface 308 of the connecting portion 3B is disposed so as to be parallel to the connecting plate 23 in a state that the engaging ledges 310c, 310d of the dented portion 309 oppose the corresponding cut-out portions 231a, 231b of the connecting plate 23. The connecting portion 3B is then pressed against the connecting plate 23. In this state, the engaging ledges 310c, 310d is fitted into the cut-out portions 231a, 231b of the connecting plate 23, and the key member 311 is pressed by the front surface of the connecting plate 23 to move to an unlock position against the resilient force of the spring 312. Thus, the connecting portion 3B is pressed against the connecting plate 23 until the connecting surface 308 coincides with the rear surface of the connecting plate 23. Thereafter, the connecting portion 3B is slid toward the rear end thereof, i.e., in the direction of an arrow B shown in FIG. 5. As a result, the engaging ledges 310a, 310b, 310c, 310d of the connecting portion 3B are engaged with the engaging portions 232a, 232b, 232c, 232d. Thus, the connecting portion 3B is fixed to the connecting plate 23 in an undetachable manner. At the same time, the key member 311 is moved to a lock position by the resilient force of the spring 312 to be engaged with the engaging portion 233. Thus, the image sensing unit 3 can be locked to the connecting plate 23.

Figure 6:
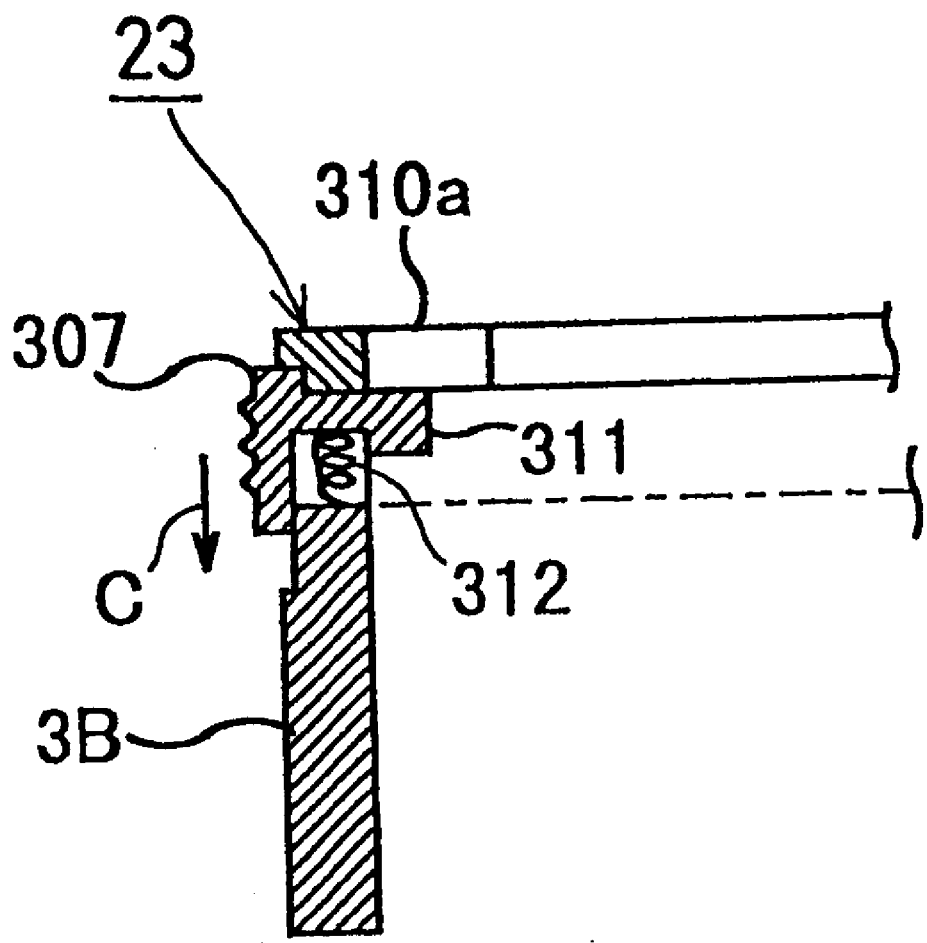
FIG. 6 is a cross-sectional view of the locking mechanism of the image sensing unit for locking the connecting plate.

The image sensing unit 3 can be detached from the connecting plate 23 by the following steps. First, the unlock lever 307 is moved in the direction of coming apart from the connecting surface 308, i.e., in the direction of an arrow C shown in FIG. 6 to the unlock position shown by the broken line to unlock the engagement of the key member 311 and the engaging portion 233. In this state, the connecting portion 3B can be slid in the reverse, direction of an arrow B shown in FIG. 5 along the connecting plate 23. Thereafter, the connecting portion 3B is moved in the direction of coming off the connecting plate 23. Thus, the image sensing unit 3 can be detached from the connecting plate 23.

Figure 8A:
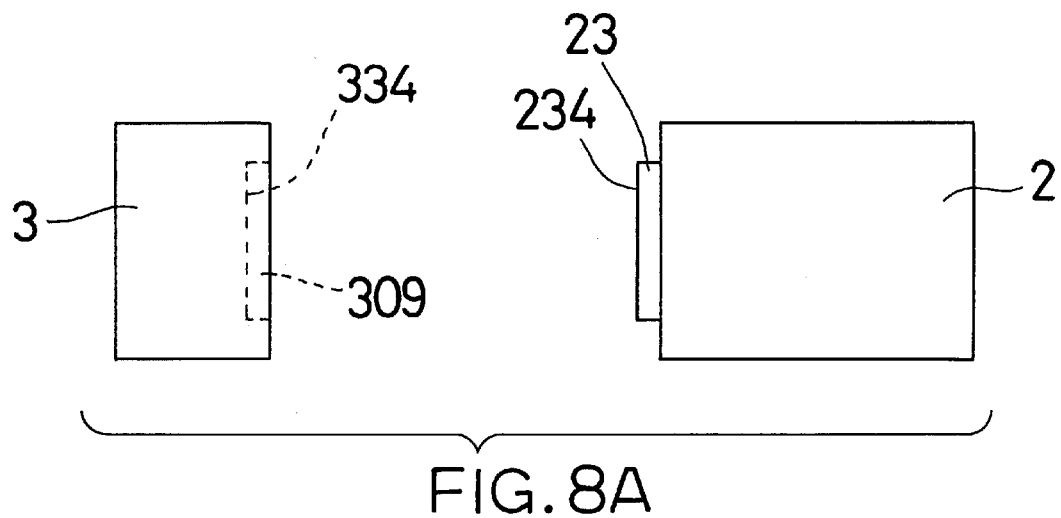
FIGS. 8A to 8C are explanatory views showing variations for connecting the image sensing unit and the camera main body.

The above explanation is directed to the structure in which the image sensing unit 3 is directly connected to the camera main body 3 by fitting the connecting plate 23 into the dented portion 309 of the connecting portion 3B of the image sensing unit 3 to connect the connecting terminal portions 234, 334, as shown in FIG. 8A. In this embodiment, the image sensing unit 3 can be connected to the camera main body 2 by way of an exclusive cable 32.

Figure 7:
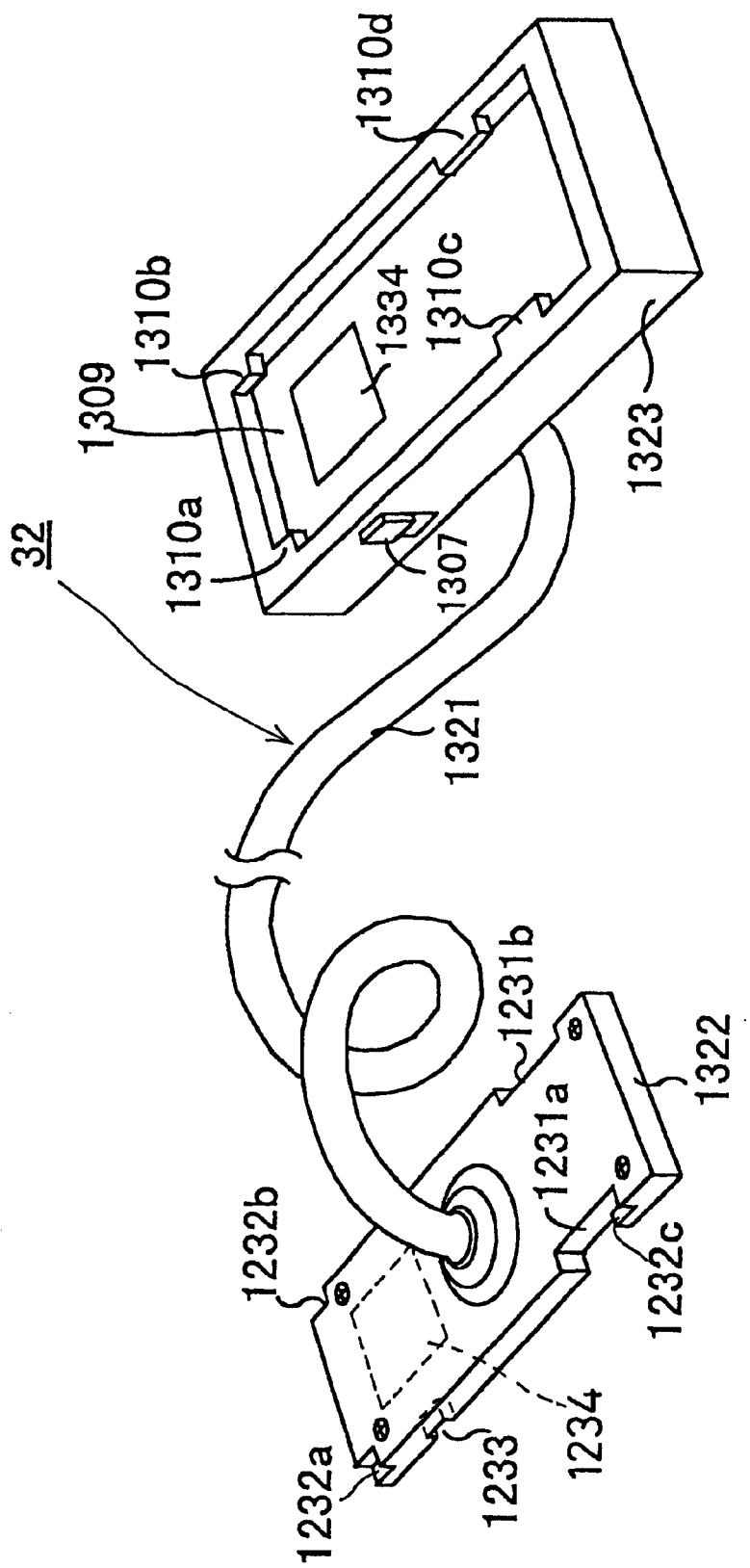
FIG. 7 is a perspective view of the connecting cable for connecting the image sensing unit and the camera main body.

FIG. 7 illustrates an appearance of the cable 32. The cable 32 has a cable portion 1321 having a length of 1 meter. At one end of the cable portion 1321, a connecting plate 1322 having the same structure as that of the connecting plate 32 for connecting the image sensing unit 3 is provided. Provided at the other end of the cable portion 1321 is a connecting portion 1323 having the same configuration as that of the connecting portion 3B of the image sensing unit 3. When connecting the image sensing unit 3 and the camera main body 2, as shown in FIGS. 8A and 8B, the connecting plate 1322 is fitted into the dented portion 309 of the connecting portion 3B of the image sensing unit 3, and the connecting plate 23 of the camera main body 2 is fitted into the dented portion 1309 of the connecting portion 1323 attached to the other end of the cable 32.

The connecting plate 1322 of the cable 32 is provided with a connecting terminal portion 1234 having a plurality of connecting terminals to be connected to the connecting terminal portion 334 provided within the dented portion 309 of the connecting portion 3B of the image sensing unit 3. Thus, when the image sensing unit 3 is connected to the camera main body 2 via the cable 32, the image sensing unit 3 and the camera main body 2 is electrically connected via the connecting terminal portions 234, 1334, 1234, 334.

Figure 8B:
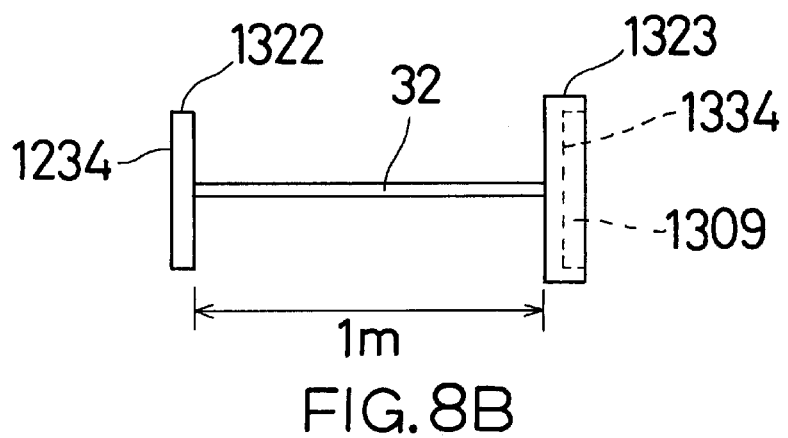
Figure 8C:
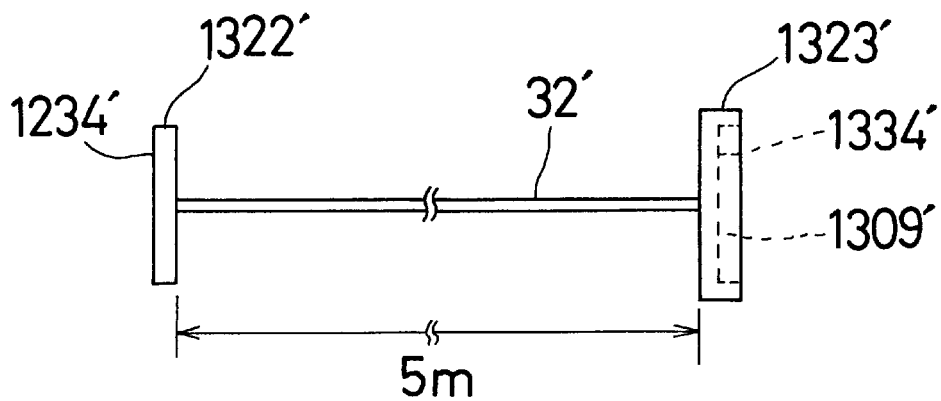
Figure 9:
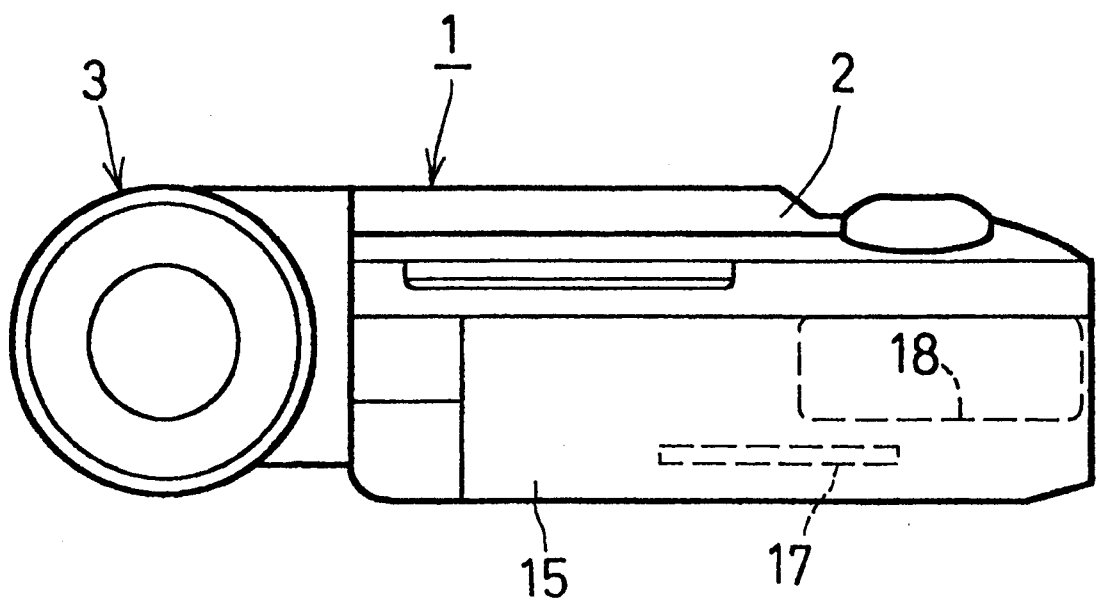
FIG. 9 is a bottom view of the digital camera shown in FIG. 1.

In this embodiment, two types of cables are provided, one of them being a cable 32 having a length of 1 meter, as shown in FIG. 8B, the other being a cable 32' having a length of 5 meters as shown in FIG. 8C. The image sensing unit 3 can be connected to the camera main body 2 by way of the cable 32' having a length of 5 meters, in the same matter as in the case where the cable 32 having a length of 1 meter is used. In detail, as shown in FIGS. 8A and 8C, the connecting plate 1322' of the cable 32' is fitted into the dented portion 309 of the connecting portion 3B of the image sensing unit 3, and the connecting plate 23 of the camera main body 2 is fitted into the dented portion 1309' of the connecting portion 1323' attached to the other end of the cable 32'. In this connected state, the image sensing unit 3 and the camera main body 2 are electrically connected via the connecting terminal portions 234, 1334', 1234', 334.

As will be explained later, the level of the two contact points f1, f2 provided to the connecting terminal portion 234 of the camera main body 2 is designed such that the level is different in accordance with the connecting state of the camera main body 2 and the image sensing unit 3. Therefore, it is possible to detect if they are connected directly or connected via a cable. Furthermore, it is also possible to detect the length of the cable in a case where they are connected via a cable.

Now referring to FIG. 1, a grip 4 is formed in the left-hand side of the front face of the camera main body 2, and a built-in flash lamp 5 is provided in the right-hand upper side at an appropriate position. Frame forwarding and rewinding switches 6 and 7 are provided near the centre of the top face of the camera main body 2 as shown in FIG. 3. The forwarding switch 6 feeds the frame in the direction that the frame number increases in the photographed order, and is referred to as an UP key 6. The rewinding switch 7 feeds the frame in the direction that the frame number decreases, and is referred to as a DOWN key 7. A delete key D for deleting the images recorded in the memory card 8 is provided on the left side of the DOWN key 7, and a shutter release button 9 is provided on the right side of the UP key 6 in the rear view.

As shown in FIG. 3, an LCD 10 is provided in the middle of the left-hand side of the rear face of the camera main body 2. The LCD 10 functions as a view finder during photographing, and as a display during the reproduction of the recorded image.

Provided at the lower side of the LCD 10 is a compression rate setting slide switch 12 for switching the compression rate K of the image data to be recorded in the memory card 8. A power switch PS, a flash lamp (which may be abbreviated as "FL") mode setting switch 11, or the like, are provided on the upper side of the LCD 10. The connection terminal 13 for externally connecting a personal computer is provided on the side face of the camera main body 2.

The flash lamp of the digital camera 1 has an "automatic flash mode", a "forcible flash mode", and a "flash prohibition mode". In the "automatic flash mode", the built-in flash lamp 5 is automatically flashed according to the luminance of the object. In the "forcible flash mode", the built-in flash lamp 5 is forcibly flashed:regardless of the luminance of the object. In the "flash prohibition mode", light emission of the built-in flash lamp 5 is prohibited. Every time the user presses the FL mode setting key 11 positioned above the LCD 10 on the rear face of the camera main body 2, the flash mode is switched among three modes in a cyclic order.

The digital camera 1 has a ⅛ compression rate and a 1/20 compression rate, and the user can select the preferred compression rate K. For example, if the compression rate setting switch 12 is shifted to the right, the compression rate K is set to ⅛, and if it is shifted to the left, the compression rate K is set to 1/20.

Although, in this embodiment, the compression rate K is set two modes, it may be set to three or more values.

A photographing/reproduction mode setting switch 14 for selecting the "photographing mode" or the "reproduction mode" is provided at the top right of the rear face of the camera main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch 14 is shifted to the right, the reproduction mode is selected, and if shifted to the left, the photographing mode is selected.

A battery cavity 18 and a slot 17 for receiving the memory card 8 are positioned on the bottom face of the camera main body 2. The battery cavity 18 and the slot 17 are covered with a clam-shell type cover 15. The digital camera 1 according to the embodiment has a power supply source E consisting of four AA batteries connected in series.

Figure 10:
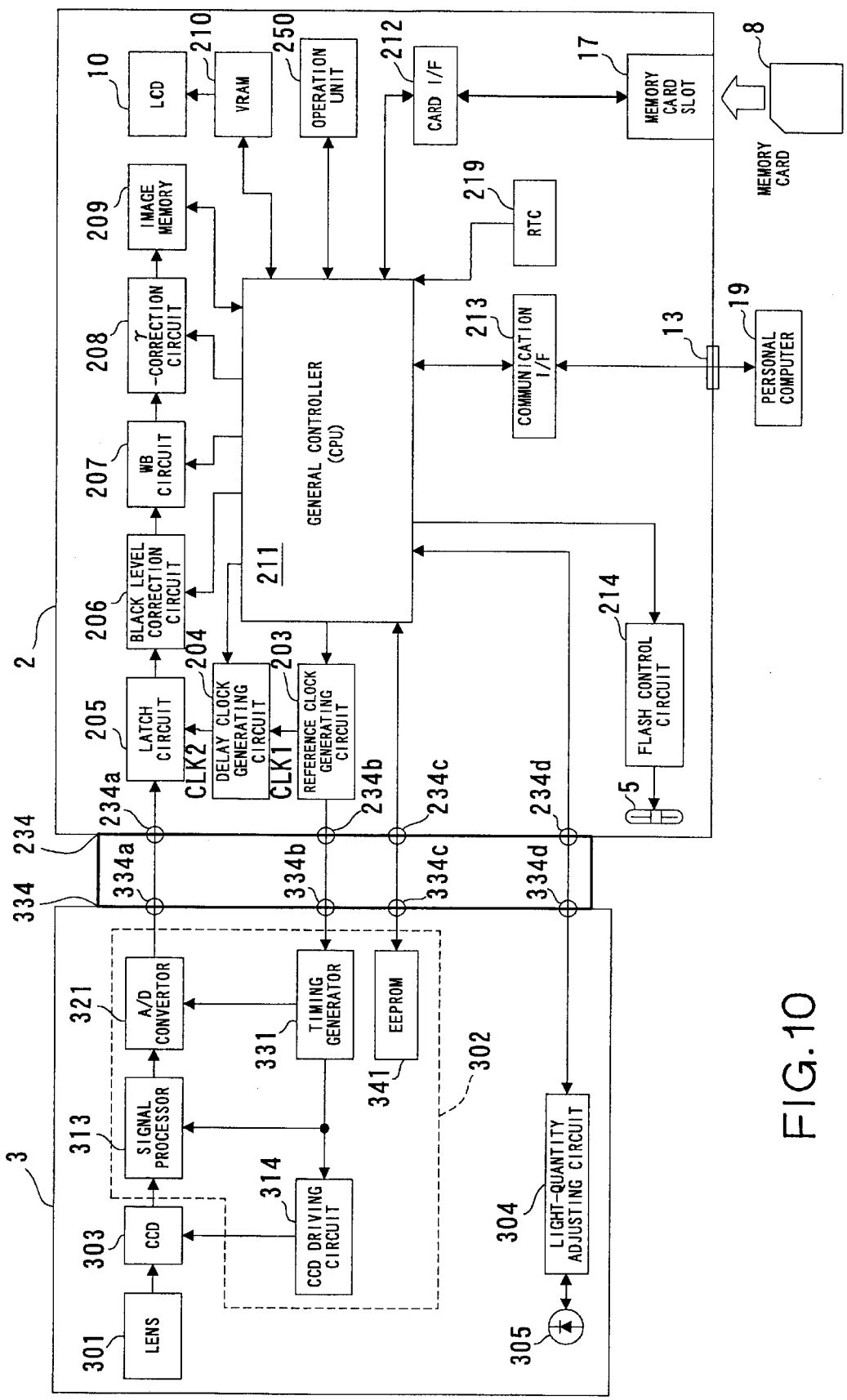
FIG. 10 is a block diagram showing the control system of the digital camera shown in FIG. 1.

FIG. 10 is a block diagram of the control system of the image sensing unit 3.

FIG. 10 illustrates the state that the image sensing unit 3 and the camera main body 2 are connected directly, i.e., without using the cable 32 or the cable 32'.

The CCD 303 in the image sensing unit 3 photoelectrically converts the optical image of the object focused by the macrozoom lens 301 into image signals of three colour components R (red), G (green) and B (blue), and outputs the image signals to the signal processor 313. This image signal consists of sequence of pixel signals received by the respective pixels. A timing generator 331 generates various timing pulses for controlling and driving the CCD 303.

Since the diaphragm of the image sensing unit 3 is fixed, the exposure of the image sensing unit 3 is controlled by adjusting the quantity of exposure of the CCD 303, that is, the charge accumulation time of the CCD 303, which corresponds to the shutter speed. If the luminance of the object is too low to select to an appropriate shutter speed, the level of the image signal outputted from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313.

The CCD driving circuit 314 generates a driving control signal for the CCD 303 based on the signal supplied from the timing generator 331. The signals generated by the timing generator 314 includes timing signals for the A/D converter 321, and clock signals (horizontal transfer signals, vertical transfer signals, etc.) for controlling the reading timing of the light-receiving signals from the respective pixels.

The signal processor 313 applies a prescribed analogue signal processing to the analog image signal outputted from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 sets the light emission of the built-in flash lamp 5 to a predetermined level determined by the general controller 211 when the flash lamp is used during the photographing. During the flash photographing, the flash light reflected from the object is received by the light-adjusting sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash lamp 5, whereby the light emission amount of the built-in flash lamp 5 can be regulated to the prescribed level.

One of the features of the present embodiment is that the A/D converter 321 is provided in the image sensing unit 3.

The A/D converter 321 converts each pixel signal (i.e., analog signal) of the image signal sequence into a 10-bit digital signal based on the A/D conversion clock supplied from the timing generator 331.

An EEPROM 341 stores, for example, an effective pixel number of the CCD or information on the structural type of the image sensing unit 3 such as a filter structure. The image sensing unit 3 can be exchanged with another image sensing unit having another optical element or CCD. When the image sensing unit is exchanged, the camera main body 2 is controlled in accordance with the information on the image sensing unit 3 obtained from the EEPROM 341.

The aforementioned image sensing unit 3 and the camera main body 2 which will be described later are electrically connected with each other by way of a group of four connecting terminals 334a, 334b, 334c, 334d provided at the connecting terminal portion 334 and a group of four connecting terminals 234a, 234b, 234c, 234d provided at the connecting terminal portion 234.

Next, inner structure of the camera main body 2 will be explained.

When the camera main body 2 is connected directly or via the cable 32 to the image sensing unit 3, the 10-bit digital image signal outputted from the A/D converter 321 in the image sensing unit 3 is latched by the latch circuit 205 provided in the camera main body 2.

A reference clock generating circuit 203 and a delay clock generating circuit 204 are also provided in the camera main body 2. The reference clock generating circuit 203 generates a clock CLK1 for the timing generator 331. The delay clock generating circuit 204 supplies a clock CLK2 for the latch circuit 205 based on the reference clock. These circuits 203, 204 are controlled by the general controller 211.

A black level correction circuit 206 corrects the black level of the digitalized pixel signal (hereinafter referred to as pixel data) converted by the A/D converter 321 to the reference black level. A white balance circuit (hereinafter referred to as WB circuit) 207 converts the level of the pixel data of each colour,component of R, G or B, so that the white balance can be adjusted after γ (gamma) correction. The WB circuit 207 converts the level of the pixel data of each colour component R, G, B using a level conversion table inputted from the general controller 211.

The conversion, coefficient (or the slope of the characteristic line): for each colour component in the level conversion table is set each photographed image by the general controller 211.

The gamma correction circuit 208 corrects for the gamma characteristic of the pixel data. The gamma correction circuit 208 has, for example, six gamma correction tables with different gamma characteristics, and uses the most appropriate gamma correction table according to the photographed scene or the photographic conditions.

An image memory 209 stores the pixel data outputted from the gamma correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data to be reproduced and displayed on the LCD 10. The memory capacity of the VRAM 210 corresponds to the number of pixels of the LCD 10.

In the photographing preparation mode, each pixel data of the image taken by the image sensing unit 3 every 1/30 seconds is subjected to the prescribed signal processing by the sequence from the A/D converter 321 to the gamma correction circuit 208, and stored in the image memory 209. This pixel data is simultaneously transferred to the VRAM 210 via the general controller 211, and displayed on the LCD 10. The user can see the photographed object on the LCD 10. In the reproduction mode, the image read but from the memory card 8 is subjected to the prescribed signal!processing by the general controller 211, which is then transferred to the VRAM 210, and displayed on the LCD 10.

A card I/F 212 is an interface for writing the image data into the memory card 8 or reading the image data from the memory card 8. A communication I/F 213 is an interface based on, for example, the USB standard, or an interface for externally connecting the personal computer 19.

A flash control circuit 214 controls light emission of the built-in flash lamp 5. In particular, the flash control circuit 214 controls the quantity of flash light, flash timing, and so on, based on the control signal supplied from the general controller 211. The flash control circuit 214 also brings the light emission to zero based on the flash stop signal inputted from the light-quantity adjusting circuit 304.

An RTC (Real Time Clock) 219 is a time circuit for keeping the track of the date and time of each photograph, which is driven by a separate power source (not shown).

An operation unit 250 has switches including the UP key 6, the DOWN key 7, the shutter release button 9, the FL mode setting key 11, the compression rate setting key 12, and the photographing/reproduction mode setting switch 14.

The general controller 211 comprises a micro computer, and it organically controls the driving timing of each element in the image sensing unit 3 and the camera main body 2 so as to generally control the photographing operation of the digital camera 1.

If in the photographing mode the shutter button 9 is pressed to start photographing, the general controller 211 creates a thumb nail image created from the image taken in the image memory 209 after the start of the photographing operation, and the compressed image created by a JPEG method at the compression rate K when the compression mode is selected by manipulating the compression rate setting slide switch 12. A tag information (such as the frame number, exposure value, shutter speed, compression rate K, photographing date and time, flash ON/OFF data, scene information, image type, judged result of the image, etc) stored in the memory card 8, the compressed image and the thumb nail image are stored in the memory card 8.

Figure 11:
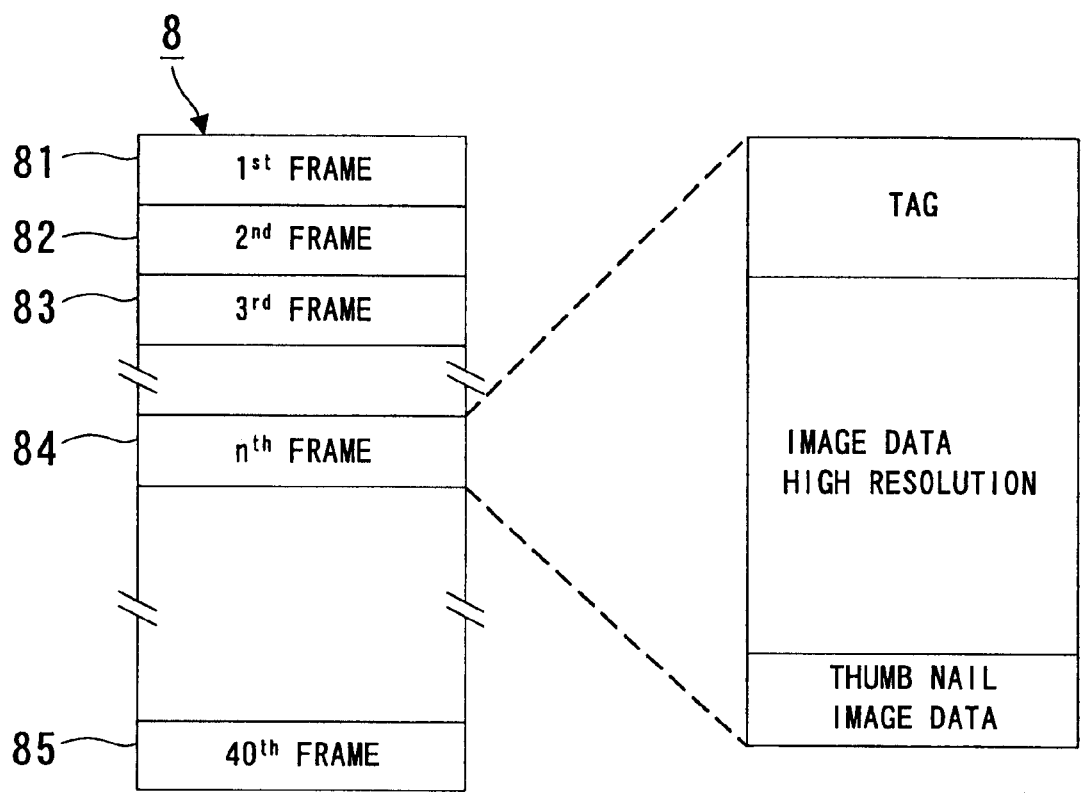
FIG. 11 illustrates the data-storage structure of the memory card.

As shown in FIG. 11, the memory card 8 can store forty frames of images taken by the digital camera 1 at a ½₀ compression rate. Each of the frames 81–85 has tag information, high-resolution image data (640×480 pixels) compressed by a JPEG method, and thumb nail image data (80×60 pixels). Each frame may be treated as an image file of EXIF type.

<Timing Control in a case of a cable connection>

Figure 12:
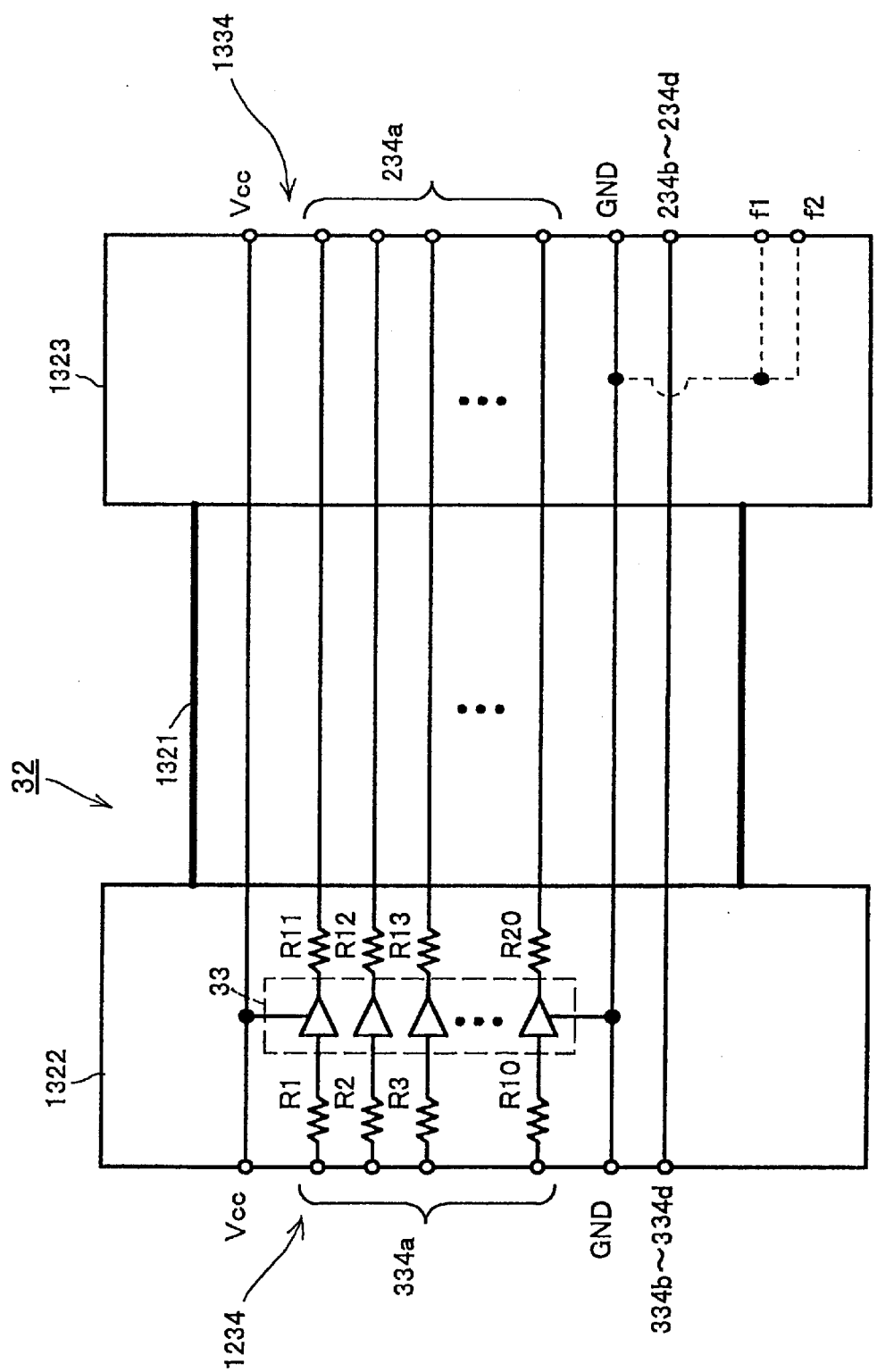
FIG. 12 illustrates the connecting state of the cable.

The connection of the cable 32, 32' and the timing control in a case where the image sensing unit 3 and the camera main body 2 are connected via the cable 32 will now be explained with reference to FIGS. 12 to 14. Although FIG. 12 is directed to the case where the cable 32 having a length of 1 meter is used, the same explanation can be applied to the case where the cable 32' having a length of 5 meters, except for the connection of the terminals f1, f2. Therefore, the following explanation of each terminal of the cable will be mainly directed to the cable 32 having a length of 1 meter. In FIG. 12, each terminal of the connecting terminal portions 1234, 1334 of the connecting plate 1322 and the connecting portion 1323 connected to the ends of the cable 32 are allotted by the same reference numerals of the terminals of the camera main body 2 and the image sensing unit 3 to which each terminal is connected.

The connecting terminal portion 1234 of the connecting plate 1322 for connecting the image sensing unit 3 is provided with a power terminal Vcc, terminals 334*a* to which 10-bit digital image signals outputted from the A/D converter 321 are inputted, a ground terminal GND and terminals 334*b*–334*d* for receiving and transmitting various signals. On the other hand, provided to the connecting portion 1323 for connecting the camera main body 2 are terminals 234*a* corresponding to the aforementioned terminals 334*a*, a ground terminal GND corresponding to the aforementioned ground terminal GND, terminals 234*b*–234*d* corresponding to the aforementioned terminals 334*b*–334*d*. Each terminal of the connecting plate 1322 is connected to each terminal of the connecting portion 1323 by a plurality of electric wires constituting the cable portion 1321.

In the connecting plate 1322, the terminals 334*a* for receiving signals supplied from the A/D converter 321 are connected to resistors R1–R10 for protecting from static electricity, a buffer amplifier 33 for lowering the level of the image signal and the wave distortion and resistors R11–R20 for protecting from static electricity in series. Connected to the other ends of the resistors R11–R20 are terminals 234*a* of the connecting portion 1323. By interposing the resistors R1–R20 and the buffer amplifier 33 as mentioned above, even in a case where the image sensing unit 3 is connected to the camera main body 2 via the cable 32, the camera main body 2 can surely obtain image data while preventing the deterioration of photographed image.

The connecting terminal portion 234 of the connecting plate 23 connected to the camera main body 2 has two connecting terminals f1, f2. On the other hand, the connecting portion 1323 of the cable 32 has terminals f1, f2 to be connected to the aforementioned terminals f1, f2 of the connecting terminal portion 234. Furthermore, the image sensing unit 3 has also corresponding terminals f1, f2. These terminals f1, f2 are set so as to be connected to the camera main body 2, the cable 32, 32' and the image sensing unit 3 as will be mentioned below. Thus, it is possible to judge the connecting status of the camera main body 2 and the image sensing unit 3.

Figure 13A:
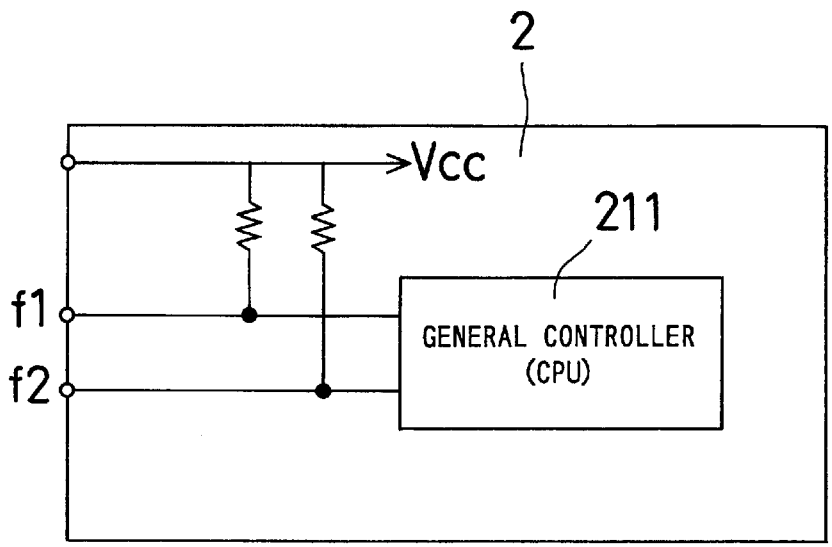
FIG. 13A to 13D illustrates the connecting state of the judging terminal for judging the connecting state of the image sensing unit and the camera main body.

As shown in FIG. 13A, the voltage of the connecting terminals f1, f2 of the camera main body 2 are pulled up to that of the power source Vcc. Therefore, in a case where nothing is connected to the connecting terminals f1, f2, the level of each connecting terminal f1, f2 is kept to H (high level), i.e., f1=H and f2=H.

Figure 13B:
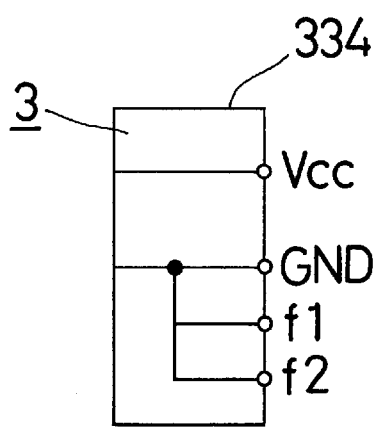

As shown in FIG. 13B, the terminals f1, f2 of the image sensing unit 3 are kept to the ground level. Thus, in a case where the image sensing unit 3 is connected to the camera main body 2, the level of each terminal f1, f2 of the camera main body 2 becomes to L (low level), i.e, f1=L and f2=L.

Figure 13C:
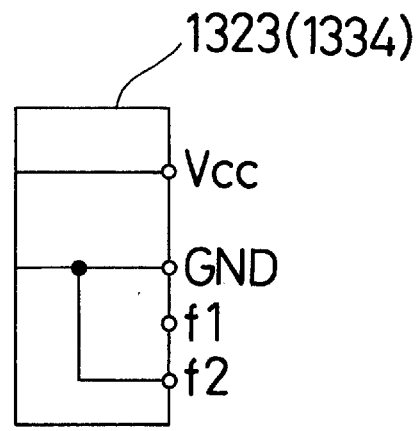

In the cable 32 having a length of 1 meter, as shown in FIG. 13C, the terminal f2 is connected to GND and the terminal f1 is opened. Thus, in a case where the image sensing unit 3 is connected to the camera main body 2, the terminals f1, f2 of the camera main body 2 becomes H and L, respectively, i.e. f1=H and f2=L.

Figure 13D:
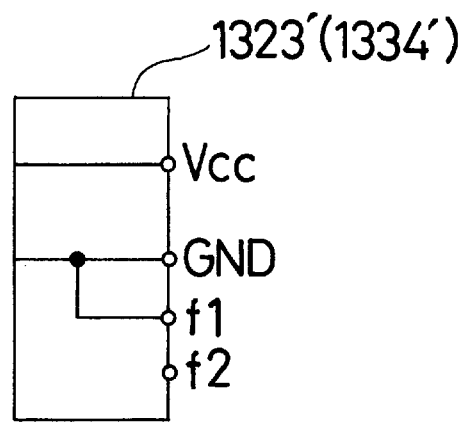

In the cable 32:' having a length of 5 meters, as shown in FIG. 13D, as shown in FIG. 13D, the terminal f1 is connected to GND and the terminal f2 is opened. Thus, in a case where the image sensing unit 3 is connected to the camera main body 2 via the cable 32' having a length of 5 meters, the terminals f1, f2 become L and H, respectively, i.e., f1=L, f2=H.

As mentioned above, since the combination of the level of the two terminals f1, f2 of the camera main body 2 is changed in accordance with the connecting status of the image sensing unit 3 and the camera main body 2, it is possible to judge the connecting status by the general controller 211.

The timing of the latch in the camera main body 2 depending on the lengths of the cables 32, 32' will be explained with referring to FIG. 14.

(1) In a case where the image sensing unit 3 is directly connected to the camera main body 2 (FIG. 14A)

The general controller 211 instructs the delay clock generating circuit 204 to output a clock with no delay. Thus, the latch circuit 205 is driven by the delay clock CLK2 with delay time 0 relative to the reference clock CLK1. The A/D converted image signal is inputted into the latch circuit 205, and latched at the timing of the upward-arrow shown in FIG. 14A.

(2) In a case where the image sensing unit 3 is connected to the camera main body 2 via the cable having a length of 1 meter (FIG. 14B)

The A/D converted image signal is inputted into the latch circuit 205. Although the buffer amplifier 33 is mounted in the cable 32, the delayed and distorted image signal is inputted into the latch circuit 205. Thus, in a case where the general controller 211 detects that the cable 32 having a length of 1 meter is used, the general controller 211 instructs the delay clock generating circuit 204 to output a delay clock CLK2' with a phase delayed by time t1. Since the image signal inputted into the latch circuit 205 is latched at CLK2', the latch circuit 205 outputs an image signal from which influence of the wave distortion by the cable 32 is completely deleted.

(3) In a case where the image sensing unit 3 is connected to the camera main body 2 via the cable having a length of 5 meters (FIG. 14C)

The A/D converted image signal is inputted into the latch circuit 205. Although the buffer amplifier 33 is mounted in the cable 32, the image signal, which is a little bit delayed and distorted as compared to the case where the image sensing unit 3 is connected to the' camera main body 2 via the cable having a length of 1 meter, is inputted into the latch circuit 205. Thus, in a case where the general controller 211 detects that the cable 32' having, a length of 5 meters is used, the general controller 211 instructs the delay clock generating circuit 204 to output a delay clock CLK2" with a phase delayed by time t2 (t2>t1). Since the image signal inputted into the latch circuit 205 is latched at CLK2", the latch circuit 205 outputs an image signal from which influence of the wave distortion by the cable 32' is completely deleted.

As mentioned above, by providing the latch circuit 205 for latching the digital image signal supplied from the A/D converter mounted in the image sensing unit 3 via the cable 32, 32' in the camera main body 2 and delaying the latching timing of the image signal in accordance with the length of the cable, the same output signal as that obtained when the image sensing unit 3 is directly connected to the camera main body 2 can be obtained, which enables an appropriate image processing at the image processing portion.

In the above mentioned embodiment, although the delay time t1, t2 is set by adjusting the firmware of the general controller 211, a hardware such as timer means may be employed. Further, although two kinds of cables are used in the above mentioned embodiment, it is possible to use more than two kinds of cables with an increased number of the recognizing terminals.

According to the above mentioned embodiment, since the A/D converter, which converts the analog image signal supplied from the image pick-up element into the digital image signal, is provided at the image sensing unit which is detachably attached to the camera main body, the image signal to be transmitted to the camera main body from the image sensing unit becomes digital signal. Therefore, even if the image sensing unit is connected to the camera main body via a cable, the influence of noise can be decreased as compared to the case where the analog image signal is transmitted. Thus, an appropriate digital image signal can be inputted into the image processing portion. Furthermore, it is not required to raise the gain of the image signal at the image sensing unit side and the power consumption rate can be decreased, which enhances the utility of the digital camera.

Since the camera main body is equipped with the latch circuit for latching and outputting the digital image signal from the A/D converter into the image processing portion, the signal wave distortion or signal delay caused by the connection of the cable can be deleted by setting the latch timing by the latch means.

Since detector for detecting the length of the cable is provided and the timing for latching the image signal is changed depending on a detected result of said detector, an appropriate correction of the distortion of the wave distortions or the like can be performed even if the length of the cable changes. Accordingly, it is possible to use various kinds of cables with different length.

Since the timing for latching is changed to be delayed in accordance with the length of the cable, even if a cable having a long length is used, the distortion of the signal wave can be avoided.

Since the judging processing portion for judging whether the image sensing unit is directly connected to the camera main body or the image sensing unit is connected to the camera main body via the cable and the timing for latching the image signal is changed depending on the result of the judging means, an appropriate image signal can be outputted to the image processing portion, either when the image sensing unit is directly connected to the camera main body or the image sensing unit is connected to the camera main body via the cable.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. A digital camera, comprising:
   a camera main body; and
   an image sensing unit which is detachably connected to said camera main body and electrically connectable to said camera main body via a cable in a state that said image sensing unit is detached from said camera main body,
   wherein said image sensing unit includes:
      a taking lens;
      an image pick-up element for picking up an object image focused by said taking lens; and
      an A/D converter which converts an analog image signal outputted from said image pick-up element into a digital image signal, and
   wherein said camera main body includes:
      a latch circuit for restoring a waveform of the digital image signal sent from said A/D converter; and
      an image processor for subjecting a prescribed image processing to the restored digital image signal.

2. The digital camera according to claim 1, further comprising a detector for detecting a type of said cable connected to said camera main body.

3. The digital camera according to claim 2, wherein a timing for latching the digital image signal by said latching circuit is changed depending on a detected result of said detector.

4. The digital camera according to claim 3, wherein the type of said cable includes information on a length of said cable.

5. The digital camera according to claim 1, further comprising a judge processing portion for judging a connection status of said camera main body and said image sensing unit.

6. The digital camera according to claim 5, wherein a timing for latching the digital signal by said latching circuit is changed depending on a result of said judge processing portion.

7. The digital camera according to claim 1, further comprising a cable for connecting said image sensing unit and said camera main body.

8. The digital camera according to claim 7, wherein said cable is provided with a terminal for representing a type of said cable at a connecting portion to be connected to said camera main body.

9. The digital camera according to claim 8, wherein said camera main body includes a judging processing portion for judging a connecting status of a connecting portion of said camera main body.

10. A camera main body for use in a digital camera system including said camera main body and an image sensing unit which is detachably connected to said camera main body and electrically connectable to said camera main body via a cable in a state that said image sensing unit is detached from said camera main body, said camera main body, comprising:

a connecting portion to which an image signal digitalized at said image sensing unit and outputted therefrom is inputted;

a latch circuit for latching the digital image signal supplied through said connecting portion, the latch circuit restoring a waveform of the digital image signal;

a signal processor for subjecting a prescribed image processing to the digitalized image signal from said latch circuit; and a controller which detects which of said image sensing unit and said cable is connected to said connecting portion and changes a latch timing of said latch circuit depending on a result detected by said controller.

11. The camera main body according to claim 10, wherein said controller detects which type of cable from a plurality of cables is connected to said connecting portion.

12. The camera main body according to claim 11, wherein the type of cable includes information on a length of said cable.

13. A method for processing a signal in a digital camera system including a camera main body and an image sensing unit which is detachably connected to the camera main body and electrically connectable to the camera main body via a cable in a state that the image sensing unit is detached from the camera main body, the method including the steps of:

judging whether the image sensing unit is connected to the camera main body or the cable is connected to the camera main body;

changing a latch timing of a latch circuit depending on a judgement, the latch circuit latching a digital image signal which is outputted from the image sensing unit and inputted to the camera main body and restoring a waveform of the digital image signal outputted from the image sensing unit.

14. The method according to claim 13, wherein it is judged which type of cable from a plurality of cables is connected to said camera main body.

15. The method according to claim 14, wherein the type of cable includes information on a length of said cable.

* * * * *

UNITED STATES PATENT AND TRADEMARK OFFICE
CERTIFICATE OF CORRECTION

PATENT NO. : 6,707,490 B1
DATED : March 16, 2004
INVENTOR(S) : Toshihito Kido et al.

It is certified that error appears in the above-identified patent and that said Letters Patent is hereby corrected as shown below:

<u>Column 12,</u>
Line 61, change "3" to -- 2 --.

Signed and Sealed this

Eighth Day of February, 2005

JON W. DUDAS
*Director of the United States Patent and Trademark Office*